Nov. 13, 1934.　　　　G. B. WATKINS　　　　1,980,510
PROCESS FOR PRODUCING SAFETY GLASS
Filed Feb. 26, 1931
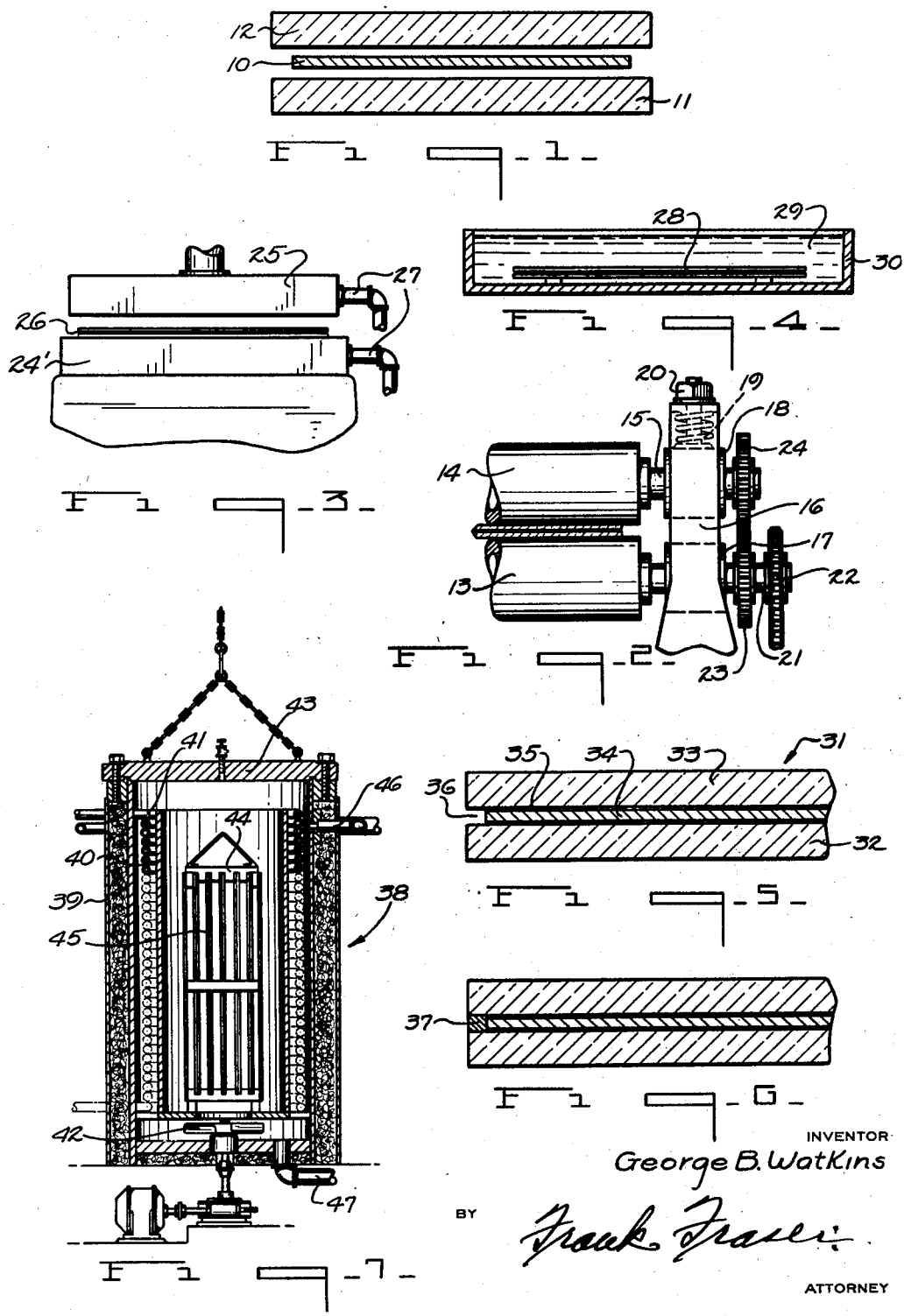
INVENTOR
George B. Watkins
BY Frank Fraser
ATTORNEY Patented Nov. 13, 1934

1,980,510

UNITED STATES PATENT OFFICE 1,980,510

PROCESS FOR PRODUCING SAFETY GLASS

George B. Watkins, Toledo, Ohio, assignor to Libbey-Owens-Ford Glass Company, Toledo, Ohio, a corporation of Ohio Application February 26, 1931, Serial No. 518,371

6 Claims. (Cl. 49—81)

The present invention relates to a process for producing safety or laminated glass.

Safety or laminated glass ordinarily comprises two sheets of glass and an interposed sheet or layer of plastitc material, for example, pyroxylin plastic. Various forms of adhesive or other bond inducing agents can be employed to assist in getting the bond between the laminations. Usually, after the laminations have been suitably treated with the bond inducing agent and assembled in sandwich form, the assembly is subjected to the combined action of heat and pressure to create a composite structure. With some forms of bonding agents and where cellulose composition materials, and particularly pyroxylin plastic, are used as the non-brittle portion of the safety glass, it is desirable to seal the edges of the laminated sheet so that it will withstand weathering without the development of marginal separations ordinarily called "letgoes". An effective seal can be produced by providing a channel around the marginal portions of the laminated sheet, and such channel can be formed by undercutting or otherwise removing the marginal portions of the plastic layer, and then placing a weatherproofing material in the channel.

The use of a fluid pressing medium in the manufacture of safety glass is desirable because such pressing medium results in a uniform application of pressure upon all surfaces of the sandwich regardless of its flatness, etc.

It is an important object of the present invention to provide a process wherein the laminations are preliminarily pressed together and then given a treatment so that the sandwich can be subjected to the action of fluid pressure for the final pressing operation without protecting the sandwich by means of flexible containers or the like.

It is another object of the invention to provide a process wherein the sandwich can be provided with a permanent weather-proofing seal prior to its being subjected to a fluid pressure so that upon the application of the fluid pressure, the sealing material will not be forced between the outer and inner laminations, but on the other hand, will be retained in its intended place.

A still further object of the invention is to provide a process wherein the plastic layer can be made an original size smaller than the glass laminations so that when assembled, the desired seal receiving channel will be created without the necessity of undercutting or removing the marginal portions of the plastic layer after assembly.

Other objects and advantages of the invention will become more apparent during the course of the following description when taken in connection with the accompanying drawing.

In the drawing wherein like numerals are employed to designate like parts throughout the same, Fig. 1 is a vertical sectional view through a sandwich, illustrating the laminations in spaced relation for the sake of clearness, and showing a plastic layer of smaller area than the glass laminations, Fig. 2 is a fragmentary view showing a form of preliminary pressing mechanism that can be employed, Fig. 3 is a diagrammatic representation of another type of pressing device, Fig. 4 is a vertical transverse section illustrating one step of my improved process, Fig. 5 is a fragmentary vertical section showing the laminations after they have been bonded together and illustrating the seal receiving channel before the seal has been applied, Fig. 6 is a similar section showing the seal in place, and Fig. 7 is a vertical transverse section through one form of autoclave or retort that can be used in the carrying out of my improved process.

Referring to Fig. 1, the numeral 10 designates a sheet of plastic material, for example, pyroxylin plastic, and as shown, it is placed between the two sheets of glass 11 and 12. It will be noted that the area of the plastic sheet 10 is less than that of the glass sheets. In the preferred embodiment of my invention, this condition is brought about by the use of so-called "short cut" pyroxylin plastic. This expression is employed to designate the use of pyroxylin plastic or other plastic material that is initially cut to a size smaller than that of the glass laminations so that when the assembly is made, the desired depth of seal receiving channel will be created. No attempt has been made to show the laminations in proper proportion in the drawing, as the drawing has been exaggerated for the sake of clearness. However, it may be pointed out that the depth of the seal receiving channel is preferably such that the finished sheet of safety glass will have at least a one-eighth inch depth of seal all around the marginal portions. The plastic layer can be cut by means of a die or other apparatus designed to give a good clean square cut.

As stated above, the present invention is not limited to any particular bond inducing agent or method of applying the same to the laminations. However, after the laminations have been cut to the desired size and treated with the bond inducing agent, they may be placed in sandwich form, and any suitable jig means or the like means can be employed for enabling the proper positioning of the plastic layer 10 between the glass sheets. Although the use of "short cut" celluloid is desired, it will be understood that this is not an essential feature to my improved process, as the laminations can be assembled in the usual manner and the marginal portions of the plastic removed as by undercutting.

After the properly treated laminations have been arranged in superimposed relationship, it is preferred that they be given a so-called preliminary pressing. This preliminary pressing action can be accompanied by heat treatment or not, and this will be dependent somewhat upon the character of plastic material and bond inducing agent used. In Fig. 2, a roller type pressing device is used for the pre-pressing operation, and this may consist of a pair or a series of pairs of rolls 13 and 14 supported by the shafts 15 journaled in the standards 16. As shown, the lower roll 13 is mounted in a stationary journal 17, while the upper roll is carried by the vertically movable journal 18 slidable in suitable guideways formed in the standards 16 and normally urged toward the stationary journal by means of the spring 19, the pressure of which is controlled by the bolt and nut 20. The shaft 21 of the roll 13 can be extended beyond the standards 16 a sufficient distance to accommodate the drive sprockets or other driving means 22 and also the pinion 23 meshing with the pinion 24 keyed to the shaft 15. The teeth of the pinions 23 and 24 are of sufficient length to permit of adjustment of the rolls to and from one another without disengagement of the pinions. The type of driving mechanism illustrated is, of course, diagrammatic, as independent drives can be used for the rolls if preferred. With the construction shown, upon rotation of the shaft 21 and as the pinion 23 is keyed to said shaft, the rolls will be positively rotated in opposite directions in a manner to advance the glass therebetween.

The action of the rolls 13 and 14 is preferably so controlled that the major portion of the air and other non-condensable gases will be expelled from between the laminations and also the laminations will be brought into intimate contact substantially throughout their entire areas.

In Fig. 3 a different form of pressing instrumentality is disclosed and it consists broadly of a stationary platen 24' and a movable platen 25 between which the sandwich 26 can be placed and suitably cushioned and pressure applied to the sandwich by movement of the upper platen 25. Conduits 27 can be associated with the platens and temperature controlling medium circulated through the platens as will readily be understood. It has been found that pressure treatment for a few minutes in the platen press is sufficient to give the desired preliminary pressing to the sandwich. A pressure of approximately one hundred pounds per square inch can be used and a temperature of 240° F. These figures are given by way of example only, and as stated above, the heat and pressure treatment is somewhat dependent upon the character of plastic layer and bond inducing agents used.

If the plastic layer is of the same or greater area than that of the glass sheets, or if a channel of insufficient depth is formed around the marginal portions, the glass should be undercut to give the desired depth of seal receiving channel.

The pre-pressed sandwich is then preferably dipped in a bath of solvent for a relatively short time. As shown in Fig. 4, the sandwich 28 is in a bath of solvent 29 contained in the receptacle 30. Various types of solvents can be used for this treatment. For example, acetone, diethylene glycol, monoethyl ether of diethylene glycol, mono-butyl ether of diethylene glycol, dibutyl phthalate, etc. can be employed. The length of time the sandwich is allowed to remain in the solvent bath is dependent upon the activity of the particular solvent or mixture of solvents used. Acetone, for example, is more active on pyroxylin plastic at room temperatures than is dibutyl phthalate so that time of treatment with acetone would be less than time of treatment with dibutyl phthalate to give the same results if the bonding liquids are used at the same temperature. On the other hand, in addition to the control of temperature, the action of the solvent upon the plastic can be controlled by using a mixture of two or more solvents. Obviously, the invention contemplates the control of the solvent action by temperature and pressure regulation of the solvent bath. If pressure is desired, the bath can be used in a closed receptacle.

The sandwich is given the solvent treatment for the purpose of swelling the extreme marginal portions of the plastic between the glass sheets. In the event the plastic and glass sheets are not in intimate contact entirely around the marginal portions of the plastic at the time the sandwich is introduced into the solvent bath, the swelling action of the plastic will be sufficient to cause such intimate contact and thereby create a seal. This seal should not be confused with the permanent weather resisting seal subsequently introduced into the channel. As stated above, the sandwich is given the solvent treatment for a relatively short time, possibly a minute or several minutes, depending upon the particular solvent or mixture of solvents used and the temperature, as well as the particular plastic employed.

After the desired solvent treatment has been given to the sandwich, the sandwich is taken from the solvent bath and excess solvent is removed from the channel, preferably by compressed air, although blotting paper or other absorbent material can be used for this purpose. It will, of course, be understood that in lieu of the solvent bath, the sandwich can be placed in the vapors of a solvent or the solvent can be placed in the channel by a spout or other means, although ordinarily it is preferred that the bath be used as the treatment in this way will be, for all practical purposes, uniform around the entire margins of the plastic.

In the preferred embodiment of the invention, after the excess solvent has been removed from the channel, the permanent weather resisting sealing material is arranged within the channel. In Fig. 5 is shown diagrammatically a sandwich 31 which has been pre-pressed. The sandwich consists of the glass sheets 32 and 33 between which is arranged the plastic layer 34 bonded to the glass sheets by the agent 35. The numeral 36 designates the seal receiving channel. In Fig. 6, the sealing compound 37 is arranged in the channel 36.

By reason of the fact that the marginal portions of the plastic have been swollen by the solvent treatment to seal the sandwich, the permanent weather resisting seal 37 will not be free to pass between the contacting surfaces of the plastic and glass sheets, or, stated differently, the sealing material will be confined to its intended receiving channel. The sealing compound can be introduced into the channel under pressure, by means of a rotating disc or any other suitable and desired feeding device.

After the seal 37 has been formed, it is preferred that the sandwich then be subjected to the final finishing pressure treatment and this may be done in an autoclave or retort type of apparatus 38 illustrated in Fig. 7. The particular type of autoclave shown consists of a housing 39 provided with a partition 40 spaced from the inner walls of the housing and providing a chamber which may receive the heat exchanger coils 41. An agitator 42 is disposed in the bottom of the autoclave, while a removable top 43 permits the introduction and removal of the rack 44 containing the sandwiches 45 to be acted upon. Conduits 46 and 47 are provided for the purpose of introducing and removing the fluid pressing medium into and out of the autoclave.

In operation, the rack of glass is placed in the autoclave and the top 43 fastened in position. The fluid pressure means is then circulated into the autoclave and its temperature is controlled by the heat exchanger system 41. The agitator assists in maintaining a substantially uniform temperature condition within the autoclave. Although the invention is not restricted to any particular type of fluid pressing means, nevertheless it may be pointed out that liquids, such as water, oils, solvents, or the like, can be used, although the fluid medium should not adversely affect the sealing material 37. However, as the fluid pressing medium does not contact with the plastic layer during treatment of the sandwich in the autoclave, a wide choice of fluids is permitted. The sandwich may be subjected to a temperature of approximately 240° F. for ten or fifteen minutes at a pressure of 250 or 300 pounds per square inch, while in the autoclave, although this cycle can be varied as desired.

Upon removal of the sandwich from the autoclave, the laminations will be bonded together and in addition, the seal material 37 will be firmly compacted within the channel. Should the seal material 37 be improperly installed in the channel in the first instance, the treatment in the autoclave will remedy this condition by firmly compacting the same, and in some instances, it may be desirable to add additional seal material to completely fill the channel.

The above process can be modified by placing the pre-pressed sandwich, after it has been subjected to the solvent treatment and before the seal material has been placed in the channel, directly into the autoclave. As the solvent produces a preliminary seal as above described, the fluid pressing medium in the autoclave will not be free to enter between the outer and inner laminations. The seal 37 would then be inserted into the channel after the glass has been removed from the autoclave and the channel properly cleaned if necessary.

The treatment of the sandwich with the solvent, after undercutting, or in the event "short cut" plastic is used, prior to the finishing pressing operation, is a most important part of my improved process. By way of explanation, it is set forth that I have produced a large number of commercial sheets of safety glass by pre-pressing the sandwich, treating in a solvent bath as described, then placing the sealing material in the channel, and completing the heat and pressure treatment of the sandwich after introduction of the seal. In such cases, the seal was not forced between the outer and inner laminations, but on the other hand, was retained in the channel as intended.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing safety glass, consisting in properly arranging suitably treated laminations in superimposed relationship to produce a sandwich, subjecting the sandwich thus formed to a preliminary pressing operation, then subjecting the marginal portions of the laminations to the action of a solvent, then applying a permanent weather resisting seal of plastic material to the sandwich, and then subjecting the sandwich, including the seal, to the action of a fluid under pressure.

2. The process of producing safety glass, consisting in properly arranging suitably treated laminations in superimposed relationship to produce a sandwich, subjecting the sandwich thus formed to a preliminary pressing operation, then subjecting the marginal portions of the laminations to the action of a solvent, then applying a permanent weather resisting seal of plastic material to the sandwich, and then subjecting the unprotected sandwich, including the seal, to the action of a fluid under pressure.

3. The process of producing safety glass, consisting in properly arranging suitably treated laminations in superimposed relationship to produce a sandwich, subjecting the sandwich thus formed to a preliminary pressing operation, then subjecting the marginal portions of the laminations to the action of a solvent, then applying a permanent weather resisting seal of plastic material to the sandwich, and then subjecting the sandwich, including the seal, to the action of a heated fluid under pressure.

4. The process of producing safety glass, consisting in properly arranging suitably treated laminations in superimposed relationship to produce a sandwich, subjecting the sandwich thus formed to a preliminary pressing operation to remove a material part of the gases therebetween and to bring the faces of the laminations into intimate contact, then subjecting the edges of the laminations to a solvent, then applying a permanent weather resisting seal of plastic material to the sandwich, and then subjecting the sandwich, including the seal, to the action of a fluid under pressure.

5. The process of producing safety glass, consisting in properly arranging suitably treated laminations in superimposed relationship to produce a sandwich, subjecting the sandwich thus formed to a preliminary pressing operation, said sandwich being provided with a weather resisting seal receiving channel around the edges thereof, then subjecting the sandwich to the action of a solvent to swell the inner lamination, then placing a permanent weather resisting seal of plastic material in the channel, and then subjecting the sealed sandwich to final finishing pressure treatment.

6. The process of producing safety glass comprising two sheets of glass and an interposed plastic material, consisting in properly arranging suitably treated laminations in superimposed relationship to produce a sandwich, subjecting the sandwich to a preliminary pressing operation to remove a material part of the gases therebetween and to bring the faces of the laminations into intimate contact, said sandwich being provided with a permanent seal receiving channel around the marginal portions thereof, then subjecting the marginal portions of the plastic to the action of a solvent, then placing a permanent weather resisting seal of plastic material in said channel, and then subjecting the sandwich, including the seal, to the action of a fluid under pressure.

GEORGE B. WATKINS.